Jan. 25, 1944.  M. L. CENTRELLA  2,339,910
ACCELERATOR INDICATOR
Filed Dec. 18, 1941  2 Sheets-Sheet 1
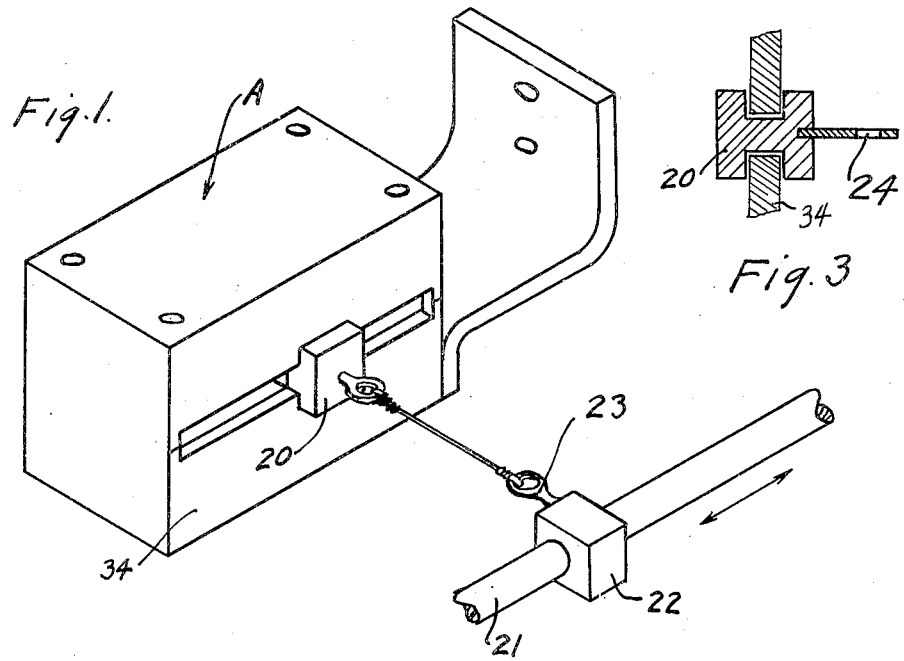
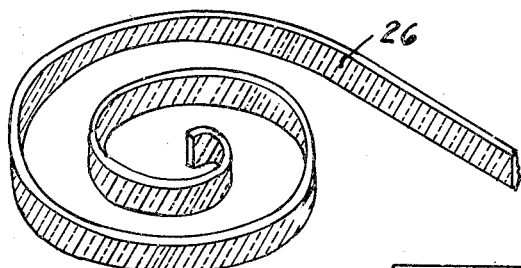
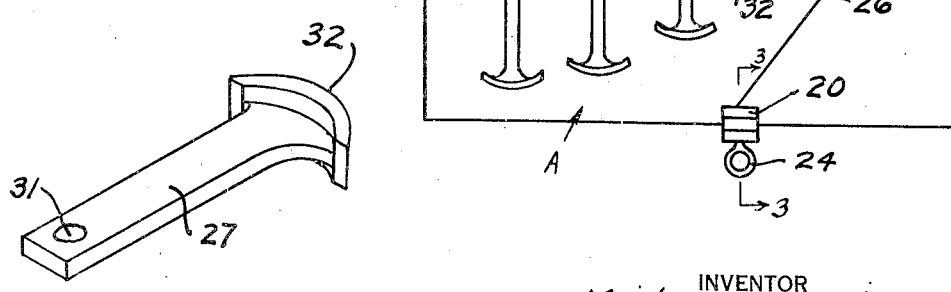
INVENTOR
Michael L. Centrella
BY Harry Longsam
ATTORNEY Jan. 25, 1944.    M. L. CENTRELLA    2,339,910
ACCELERATOR INDICATOR
Filed Dec. 18, 1941    2 Sheets-Sheet 2
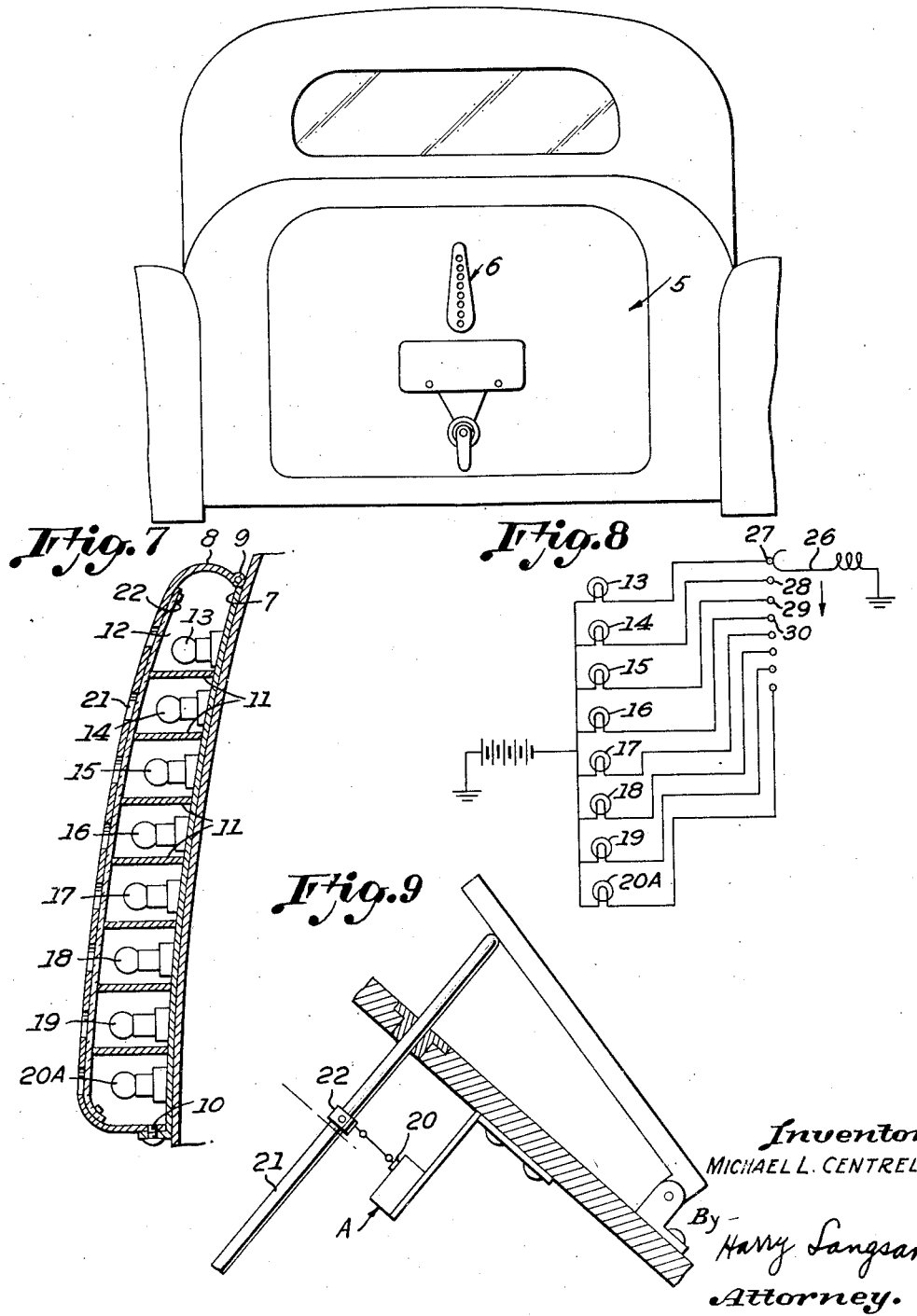

Patented Jan. 25, 1944

2,339,910

UNITED STATES PATENT OFFICE 2,339,910

ACCELERATOR INDICATOR

Michael L. Centrella, Philadelphia, Pa.

Application December 18, 1941, Serial No. 423,420

2 Claims. (Cl. 200—59)

My invention relates to signaling and relates particularly to a visual signaling unit used in conjunction with an automobile to indicate the speed of the vehicle.

Practically, there have been no devices on the market which provide for indicating the speed of automobiles to onlookers.

The advantage of this device would be to indicate definitely to the police as well as to following automobiles the speed of the vehicle carrying the visual signaling device. Having an indicator for the rear portion of the automobile would enable the car directly behind the automobile from crashing into it, particularly on roads where both automobiles may be traveling at a high rate of speed. It would also prevent rear-end collisions; and if the rear portion indicator should be advanced out of proportion to the change in speed, then the car in back would have a greater period of time to stop.

It is, therefore, an object of my invention to provide an indicator for an automobile whereby the trailing motorist may determine the speed of the car which it is following.

Another object of my invention is to provide a speed indicator or accelerator indicator for an automobile which may be readily and easily installed.

A further object of my invention is to provide a speed indicator for an automobile which may be readily connected to the accelerating unit of the automobile.

Another object of my invention is to provide a speed indicator for an automobile which will afford a greater degree of safety in driving than is now available through the use of the conventional brake stop light.

Other objects of my invention are to provide an improved device of the character described, that is easily and economically produced, which is sturdy in construction and which is highly efficient in operation.

With the above and related objects in view, my invention consists in the details of construction and combination of parts, as will be more fully understood from the following description, when read in conjunction with the accompanying drawings, in which:

Fig. 1 is a perspective view of the accelerator rod and the switch unit.

Fig. 2 is a plan view of the switch or electrical contacting device.

Fig. 3 is a sectional view of the runner taken on the line 3—3 of Fig. 2.

Fig. 4 is a view of the terminal which is engaged by the flexible spring contact unit.

Fig. 5 is a fragmentary view of the coil spring contact member.

Fig. 6 is a fragmentary rear elevational view of an automobile equipped with the accelerator indicating visual signal.

Fig. 7 is a fragmentary view of the arrangement of the electric lamp mounted upon the rear of the auto.

Fig. 8 is a schematic view of the electrical circuit.

Fig. 9 shows the accelerator rod relative to the foot control and the lamp switch.

Referring to the drawings, the numeral 5 generally refers to the rear portion of an automobile body, and more specifically it refers to the usual luggage compartment closure or rumble seat back to which is a lamp box, generally designated as 6.

It is preferable that the lamp box 6 be elongated vertically, and it consists of a base 7 which is suitably secured to the vehicle body. A shell 8 is horizontally secured at its upper end, as at 9, to the upper end of the base 7, while a set screw or similar holding means 10 holds the lower end of the shell 8 in place. Horizontally disposed partitions 11 divide the interior of the shell into a plurality of lamp compartments 12 in which are the lamps 13, 14, 15, 16 and 17. There can be more lamps, as 18, 19, 20A, if desired, or there may be a less number, if desired.

The transluscent backing strip 22 is provided at the inside of the shell 8, and this may be colored, if desired, so that the light emanating from the bulbs will throw a colored light. Suitable wires are connected to the bulbs and to an electric switch, which is generally designated as A.

The switch A is grounded to the frame, and it will be described in greater detail. The switch A is mounted on a suitable bracket so that the rectilinear moving slide 20 will operate parallel to an accelerator rod 21. The accelerator rod 21 moving in a rectilinear direction, as indicated by the arrows of Fig. 1, is parallel to the slide 20. A suitable clamp 22 is attached to the accelerator rod 21, and to the clamp 22 is attached a hook or eye 23. A similar hook 24 is attached to the H-shaped slide 20. The hooks 23 and 24 are suitably connected by a non-stretchable flexible string or rod 25.

In other words, movement of the accelerator rod 21 will carry with it movement of the slide 20. The slide 20 is connected to a spiral wound spring 26 which is of copper or other suitable electrical conducting metal. The spiral spring 26 has a tendency to coil about its own axis and is prevented from doing so by virtue of being attached at one end to the H-shaped slide 20. The other end of the spring 26 is suitably fastened so that it is electrically grounded to the chassis of the automobile.

The spring 26 is located at one corner of the base; and as the slide moves from right to left, as Fig. 2 is viewed, the spring will engage successively positioned terminals 27, 28, 29, 30, etc. Each one of the terminals 27, 28, 29, 30, etc., is of different length, but the details of construction of the terminals is the same so that a description of one terminal will suffice as the description of all the terminals. Each electrical terminal has a lead connected to a wire holding contact screw 31, and the wire is connected to one of the lamps on the lamp box 6.

The terminal 27 is elongated, and its curved contact end 32 extends at substantially right angle to the main body of the terminal and is turned or bent in the form of an arc for the purpose of permitting the spring 26 to slide in contact with the terminal. Thus, the terminal and contact are kept constantly clean to prevent corrosion and to prevent dust from collecting on the spring as well as the terminal, thereby eliminating any danger of poor electrical contact.

Each of the terminals 27, 28, 29, 30, etc., is moved closer to the track on which the slide 20 in an arithmetical progression rides, and the track is formed by the two walls 33 and 34 of the casing A. The walls 33 and 34 are suitably made part of the casing for the switch. Thus, a brief explanation of the operation of the unit is as follows:

As the accelerator arm or lever is pressed downwardly, it moves the arm 23, the cord 25 as well as the slide 20 of the switch A downwardly. A grounded wiping contact arm 26 comes into wiping engagement with the terminals 27, 28, 29, 30, etc., which terminals are connected to the wires leading to the lamps in 13, 14, 15, etc. Each one of these wires is connected to the positive (+) side of the battery. Thus, as the accelerator is pressed downwardly, the arm wipes over the contacts with the result that corresponding electrical bulbs 14, 15, 16, etc., will become energized and lighted. The motorist in a trailing vehicle can ascertain the position of how far ahead the operator has operated his accelerator and obviously any sudden release of the motorist ahead will immediately extinguish all the lights.

Incidentally, the motorist of the trailing vehicle can surmise that the driver ahead intends to stop suddenly, and he himself can act and take advantage of the time interval which always occurs between the time a driver removes his foot from the accelerator and applies his brakes, thus, energizing the usual stop light.

Although my invention has been described in considerable detail, such description is intended as illustrative rather than limiting, since the invention may be variously embodied, and the scope of the invention is to be determined as claimed.

I claim as my invention:

1. In a switch adapted to be connected to an accelerator pedal of a motor vehicle comprising a spiral spring contact member of electrical conducting material, an H-shaped slide, a pair of walls within which said slide interfits, a plurality of contact members of unequal length, means whereby said contact members are connected to a plurality of electric lamp circuits, said slide being connected to an accelerator pedal, and said spring being adapted to retard the movement of said slide.

2. My invention set forth in claim 1 wherein said terminals have a curved end which is adapted to be engaged by said spring contact member.

MICHAEL L. CENTRELLA.